United States Patent [19]

Persson et al.

[11] Patent Number: 5,035,906

[45] Date of Patent: * Jul. 30, 1991

[54] BISCUIT AND PROCESS OF PREPARATION

[75] Inventors: Tyko Persson, Morges; Héribert Duc, Orbe; Marcel Buhler, Tolochenaz, all of Switzerland

[73] Assignee: Nestec S.A., Vevey, Switzerland

[*] Notice: The portion of the term of this patent subsequent to Mar. 17, 2004 has been disclaimed.

[21] Appl. No.: 921,318

[22] Filed: Oct. 21, 1986

Related U.S. Application Data

[63] Continuation of Ser. No. 820,903, Jan. 16, 1986, Pat. No. 4,650,685, which is a continuation of Ser. No. 558,486, Dec. 6, 1983, abandoned.

[30] Foreign Application Priority Data

Dec. 30, 1982 [CH] Switzerland ............................ 7624/82

[51] Int. Cl.$^5$ ............................................ A21D 13/08
[52] U.S. Cl. .................................... 426/285; 426/549; 426/559; 426/622; 426/454
[58] Field of Search .............. 426/549, 559, 285, 622, 426/454

[56] References Cited

U.S. PATENT DOCUMENTS

| | | | |
|---|---|---|---|
| 3,722,398 | 3/1973 | Freye et al. | 425/204 |
| 3,732,109 | 5/1973 | Poat et al. | 426/559 |
| 4,438,146 | 3/1984 | Colby et al. | 426/448 |
| 4,592,916 | 6/1986 | Akesson | 426/454 X |
| 4,650,685 | 3/1987 | Persson et al. | 426/285 |

OTHER PUBLICATIONS

Colby et al, WO83/03185 (PCT/US83/00373/9/83) International Filing date 3/11/82.

Primary Examiner—Joseph Golian
Attorney, Agent, or Firm—Vogt & O'Donnell

[57] ABSTRACT

A biscuit, consisting of agglomerated granules of an extrusion cooked base, which are coated with a binder. The biscuit has a density of from 0.3 to 0.8 g/cm$^3$ and a water content of from 1.5 to 4.5% by weight. The base consists of from 40 to 80 parts by weight of cereal flour, from 0 to 20 parts by weight of sucrose and from 0.5 to 3 parts by weight of oil or fat. The base has a specific weight of from 0.1 to 0.3 g/cm$^3$. The binder consists of from 8 to 30 parts by weight of sucrose and/or mixtures of glucose and its polymers.

15 Claims, No Drawings

BISCUIT AND PROCESS OF PREPARATION

This is a continuation of application Ser. No. 06/820,903, filed Jan. 16. 1986 now U.S. Pat. No. 4,650,685, which in turn is a file wrapper continuation of application Ser. No. 06/558,486, filed on Dec. 6, 1983, now abandoned.

The present invention relates to a biscuit and a process for the manufacture thereof.

The biscuit industry conventionally uses doughs based on wheat flour, which are produced by kneading the flour with a specific quantity of water until the desired consistency is obtained. Sugar and fats are incorporated into the dough to modify its consistency and behaviour during oven baking, in particular its elasticity or friability and its tendency to rise. This conventional technique necessitates the incorporation of a considerable quantity of water into the dough, water which must then be completely evaporated during baking in an oven. The production stages are long and frequently complicated. Those preceding baking require rigorous control of a material that is active both enzymatically and microbiologically.

A recent technique is known, which allows the production of for example crunchy cocktail snacks or instant breakfast cereals by using mixtures consisting of flour and various ingredients. This technique, which is termed extrusion cooking, combines the advantages of simplicity, speed and reliability. The mixtures which are used are, in fact, rapidly heated to temperatures above 120° C., at which the enzymes are rapidly deactivated and the microorganisms are destroyed.

An object of the present invention is to provide a new type of biscuit which has original and noteworthy qualities as regards its appearance, taste, crunchiness, hydration resistance and storage, as well as a process for the manufacture of such a biscuit which differs significantly from conventional techniques and enables the technique of extrusion cooking to be used.

The biscuit according to the present invention is characterised in that it consists of agglomerated granules of an expanded baked base which are coated with a binder, and in that it has a density of from 0.3 to 0.8 g/cm³ and a water content of from 1.5 to 4.5 % by weight, the base consisting of from 40 to 80 parts by weight of cereal flour, from 0 to 20 parts by weight of sucrose and from 0.5 to 3 parts by weight of oil or fat and having a density of from 0.1 to 0.3 g/cm³ and the binder consisting of from 8 to 30 parts by weight of sucrose and/or a mixture of glucose and its polymers.

Likewise, the process for the manufacture of a biscuit according to the present invention is characterised in that, for the preparation of a base, from 40 to 80 parts by weight of cereal flour, from 0 to 20 parts by weight of sucrose, from 0.5 to 3 parts by weight of oil or fat and from 0 to 3 parts by weight of water are mixed and this mixture is then extrusion cooked under conditions such that an expanded baked base having a density of from 0.1 to 0.3 g/cm³ is obtained at the exit of an extrusion nozzle, for the preparation of a binder, from 8 to 30 parts by weight of sucrose and/or glucose syrup and from 5 to 15 parts by weight of water are mixed, the base is reduced to granules, the binder is added to the granules with stirring, a mass is produced which is shaped into biscuits by moulding under pressure and the biscuits are dried until they have a water content of from 1.5 to 4.5 % by weight.

The term cereal flour, the main ingredient of the base, is to be understood, in the present context, as designating a flour produced by milling cereal grains finely enough so that the mixture, to be used for the preparation of the base, forms a smooth, plastic mass under the effect of the compression and shearing stresses and the thermal stresses, to which it is subjected during extrusion cooking.

The term glucose syrup, a preferred ingredient of the binder, is to be understood, in the present context, as designating a mixture of glucose and its polymers obtained by partial hydrolysis of starch, having a DE (dextrose equivalent) value of about 30 to 50 and a water content of from about 15 to 25%. This water and/or the 5 to 15 parts of water, added to the binder to give it sufficient fluidity, is substantially the only water which needs to be removed during the drying of the biscuit.

The specified amount of oil or fat acts as a lubricant in the preparation of the base, facilitating the formation of a smooth plastic mass during extrusion cooking. Most edible oils or fats available on the market may be used for this purpose. Some oil or fat may for example, also be added to the binder or to the mass of binder and granules to improve the viscosity thereof, preferably in such a quantity that the fat content of the biscuit does not exceed about 5 % by weight of the dry matter. Some maltodextrin may also be added to the mass of binder and granules, to improve, if necessary, the crunchy qualities of the biscuit.

The specified 0 to 3 parts of water are used to increase the water content of the mixture to be extruded to about 18%, a good consistency for expanding the base to the desired extent when it emerges from the extrusion nozzle. In the same way, it may be said that a pressure of from 80 to 120 bars and a temperature of from 140° to 180° C. in the base before it enters the extrusion nozzle and a total extrusion cooking time of some 10 seconds are advisable to obtain a base having the desired density.

As for the sucrose, it may either be added or omitted, depending on the desired composition of the final product. It may be added to the mixture to be extruded and/or to the binder. It is not necessary to use highly refined sucrose and, in view of the natural character of this biscuit, the use of raw cane sugar is even preferred.

So that the biscuit has an attractive brown colour, and in order to balance its composition and taste, from 1 to 3 parts by weight of skimmed milk powder and from 0.3 to 2 parts by weight of sodium chloride may for example be added to the base. Likewise, from 5 to 10 parts by weight of honey may be added to the binder.

This biscuit may be produced to the best advantage in a fairly solid form, preferably in flat, simple geometric shapes such as circles, squares or stars, and be quite thick. This biscuit is meant to be eaten as it is, either by crunching it, or soaking it in a liquid such as milk, as a breakfast cereal. The biscuit has a granular appearance, reminding one of a cluster of cereal grains. This biscuit differs from products conventionally produced by the biscuit industry not only by its appearance, but also by its colour and texture. It is thus possible to produce a light-coloured, aerated biscuit using whole flour, due to fine milling and the expansion of the base, whereas, conventionally in the biscuit industry, a dark-coloured, heavy product would have been produced. In the same way, the addition of soya for example to the base, does not turn the biscuit a grey colour as one might have expected. This biscuit is crunchy and retains this quality because of its very poor hygroscopicity. Moreover, it retains its crunchy qualities for a long time after it has been soaked in a liquid. It is particularly well-suited to storage.

An advantage of this type of biscuit is that whole cereal flour may be used, i.e. a very high extraction rate flour. Thus, in a preferred embodiment of this biscuit, the cereal flour is a wheat flour of an extraction rate of from 80 to 98%. A cereal, complete with its germ, may also even be used in spite of the high enzymatic activity of the germ. All sorts of mixtures having specific nutritional advantages may be provided, particularly the combination of wheat and/or maize with legumes such as soya or peas. Thus from 5 to 15 parts by weight of a leguminous flour may be added to the base. In doing so, not only are the risks from bacteria or enzymatic reactions avoided, but it no longer becomes necessary to prepare a dough which rises. Oil seeds cannot be easily incorporated into a conventional dough because they modify its viscosity and promote the formation of channels by which carbon dioxide produced by the yeast can escape, instead of remaining trapped in the dough.

Furthermore the small quantity of water to be removed during drying means that this heat treatment need only be short and moderate, and so does not have a detrimental effect on the natural aromatic substances and the nutritionally important heat sensitive ingredients, such as lysine, in the biscuit. Valuable substances, from a nutritional or taste point of view, may thus be added to the binder or to the mass of binder and granules without incurring the risk of their being destroyed to any significant extent during drying.

The granules which make up the biscuit preferably have an average size of from 0.3 to 3 mm. The actual choice of granule size depends, on the one hand, on the size of the biscuit itself and, on the other hand, on the physical properties of the ingredients being used, particularly the viscosity of the binder and the porosity of the base. To produce the desired crunchy qualities, the binder should coat the granules thoroughly and penetrate their surface without penetrating too deeply inside them. A delicate balance has thus to be found between the size of granules, their porosity and the viscosity of the binder while at the same time observing precise time and temperature conditions during addition of the binder to the granules. Good results have been achieved, for example by preparing a binder, based on glucose syrup, having a dynamic viscosity of from 100 to 300 mPas at from 20° to 30° C., reducing the base into granules having an average size of from 0.3 to 3 mm and adding the binder to the granules by sprinkling with stirring for 2-5 min at from 20° to 30° C. Generally, a relatively small average size of granules e.g. from 0.3 to 1 mm is chosen for relatively thin biscuits, i.e. a thickness of 5 mm, and a relatively large average size of granules, e.g. from 1 to 3 mm, for relatively thick biscuits, i.e. a thickness of 10 mm, so as to produce comparable crunchy qualities for biscuits of different thicknesses. In order to easily reduce the expanded cooked base into granules, the base is preferably extruded through a nozzle having multiple openings. By using a nozzle which has numerous small holes, it is possible to obtain a bundle of expanded strands of the base, which have a small diameter and which may then be directly reduced to granules of the desired size by a rapidly rotating knife. By using a nozzle which has fewer and larger openings, it is possible to obtain strands of the base which have a larger diameter and may be immediately cut into uniform sections by a rotating knife and then ground in a conventional mill, such as a hammer mill.

In the latter case the average size of the granules may be determined by sieving them for example through several sieves having decreasing mesh sizes. In the former case, the average size may be considered in this instance as the cube root of the average volume of granules.

A rotating viscosimeter, for example of the type with coaxial cylinders and internal rotating cylinder, may be used to measure the dynamic viscosity or the apparent viscosity of the binder. The binder is poured into the cylindrical apparatus, the temperature of which is controlled, in a water bath. Measurements are taken at a rotation speed varying continuously from 0 to 380 rpm and the viscosity is obtained from this by tables.

The addition of the binder to the granules requires particular attention. It may be carried out by any industrial mixing apparatus such as a screw mixer of the helical spring type with an axial sprinkling nozzle or with a coating drum. For a binder based on glucose syrup, that is a binder consisting of at least 3 or so parts of glucose syrup to one optional part of sucrose, it is best to remain within the upper or lower areas of the above-mentioned time and temperature ranges, i.e. from 2 to 5 min and from 20° to 30° C., depending on whether the granules are small or large respectively. Particular care should be taken not to prolong the process nor to needlessly lower the viscosity of the binder, for example by heating it too much, to avoid excessive absorption of binder by the granules, which after drying would produce a hard biscuit.

Nevertheless it is also possible to use a binder consisting exclusively or for the most part of sucrose. In this instance, the binder is added to the granules while hot, that is at a temperature just above the temperature of crystallisation, to obtain an even distribution of the binder over the granules, then a rapid crystallisation of the sucrose. With this variant, a biscuit may be produced which does not soften easily when soaked in a liquid, even a hot liquid.

In order to achieve a correct impregnation of the granules with the binder, it is just as important to pay attention to the above-mentioned limits regarding the density of the extruded base. If these limits are disregarded, it is likely that unsuitable pores, which are too large or too small, will appear in the base and the granules will either become too friable and absorbing, or too dense and impermeable.

The mass which is produced by the addition of the binder to the granules is viscous and sticky and its handling requires care and adequate mechanical means. After taking the necessary precautions to prevent the apparatus which is used from becoming choked and the mass being handled roughly, this mass is then shaped into biscuits by moulding under pressure. Moulding under pressure is to be understood as designating a compaction effect being exerted on the mass so that it occupies an adequate volume without, however, breaking the structure of the granules themselves. The granules should be quite solid and this may be ensured by making crushing tests on the base when it emerges from the extrusion nozzle. The granules may be said to have a sufficiently solid structure if, for example, five sections of the base, from 7 to 15 mm in length and 6 mm in diameter, when placed side by side in a flatbottomed cylinder, can withstand a crushing force of 100 N, exerted on them by a flat piston which is guided by the cylinder. A standard value of 100 is given to such resistance.

After being removed from the mould, the biscuits are dried until they have a water content of from 1.5 to 4.5% by weight. This value is low in comparison with the 5 to 6% water content of most conventional dry biscuits and this factor also contributes to the particularly good storage properties of these biscuits. Drying may be carried out for example in conventional hot air ovens, for example at an air temperature of from 150° to 180° C. for several minutes.

The crunchy qualities of these biscuits may be assessed for example by placing a biscuit on a support having two 5 mm thick blades, positioned 55 mm apart, and by bringing a 3 mm thick blade down on this biscuit at a speed of 50 mm/min to break it in two between the two blades. By measuring the force and energy required to break the biscuit and taking the ratio of the energy to the maximum force, a number is obtained which is a good indicator of the degree of crunchiness. A ratio of less than 2 may be considered good. Too high a ratio denotes a springy, soft biscuit. As used in this disclosure with reference to a biscuit, the phrase "ratio of energy to force" means the ratio as measured by the foregoing method.

The following examples are given as illustrations. The percentages and parts given are given by weight.

EXAMPLE 1

230 kg of whole wheat flour, having an extraction rate of from 90 to 92% and a water content of from 14 to 15%, 41 kg of finely ground brown cane sugar having a sucrose content of from 97 to 98%, 1.7 kg of sodium chloride and 8.5 kg of skimmed milk powder, having a dry matter content of 96% are mixed together. The mixture is sprayed with an emulsion consisting of 6 kg of peanut oil in 9.5 kg of water, while being stirred.

The mixture is extrusion cooked in a double screw extruder where it is rapidly heated to above 120° C., produced by the intensive high-pressure friction and shearing stresses to which it is subjected. The temperature of the mixture before it enters the extrusion nozzle and the pressure exerted on the mixture just before it emerges from the nozzle are 163° C. and 100 bar respectively. The time of passage through the extruder is about 30 s. The strands of the base mixture which emerge from the 8×2 mm openings to atmospheric pressure expand under the effect of the steam which escapes from the abruptly decompressed base. They are cut into sections of from 7 to 15 mm in length by 6 mm in diameter by rotating knives. These sections have a density of 0.14 g/cm$^3$ and a crushing resistance of 107 which is determined as described above.

The sections are ground in a hammer mill, which has a screen with 3.5 mm openings. Granules having an average size of 1.2 mm are obtained, 83% of which are retained on a sieve with a 0.25 mm mesh and 78.5% pass through a sieve with a 2 mm mesh.

78 kg of glucose syrup, having a DE of 39 and a dry matter content of 83% (of which, on dry matter, 15% of glucose, 15% of maltose, 35% of tri- to heptasaccharides and 35% of polysaccharides which are higher than hepta), 20.5 kg of brown cane sugar, 30 kg of honey having a water content of 18% and 34.2 kg of water are mixed together to produce a binder having a dry matter content of 67.5% and a viscosity of 250 mPas at 20° C. and 130 mPas at 30° C.

The binder is added to the granules in batches of 4.34 kg of binder and 7.66 kg of granules, in drum coating apparatus which are 55 cm in diameter and 60 cm deep, and rotate at 19 rpm. The binder is added to the granules by spraying it from a nozzle which has two slits which project it at a rate of 1.44 kg of binder per min in the form of two widely spread streams of fine globules. The spraying operation takes 3 min, at a temperature of from 20° to 25° C.

The mass which is produced is shaped into biscuits in a machine which has flat-bottomed cylindrical chambers or moulds. Individual portions of the mass, such that the final biscuit weighs 25 g when it leaves the oven, are pressed into these chambers by flat pistons subjected to a force of from 32 to 35 N. Once the biscuits have been removed from the mould they are taken to a hot air oven where they are subjected to air temperatures of from 160° to 170° C. for from 4 to 5 min. Biscuits 80 mm in diameter and 13 mm thick, weighing 25 g are obtained which have a water content of 4%, an attractive dark brown colour and optimum crunchy qualities. Their index of crunchiness, determined in the above-mentioned manner, is slightly less than 2 whereas the maximum force required to break them in two is from 15 to 30 N. Their bacteriological quality is faultless. These biscuits keep perfectly for at least 12 months at 20° C. and for at least 3 months at 37° C. if packed in metal boxes. They may be eaten as they are or soaked in a plate of milk, for example one biscuit for every 125 g of milk. Their crunchy qualities are retained for more than 5 min in milk at ambient temperature.

EXAMPLE 2

The procedure is as described in Example 1, except that the sections of the expanded baked base are crushed by a hammer mill which has a screen with 3 mm openings. Granules of average size of 0.65 mm are obtained, 73% of which are retained on a sieve with a 0.25 mm mesh and 90% of them pass through a sieve with a 2 mm mesh.

In the manner described in Example 1, biscuits 60 mm in diameter and 8 mm thick, weighing 10 g and having a water content of 3% are obtained. Their quantities when eaten are very similar to those of the biscuit described in Example 1, although they are slightly smaller. Their index of crunchiness is also slightly less than 2 whereas the maximum force required to break them in two is from 10 to 20 N.

EXAMPLE 3

194 kg of wheat flour, having an extraction rate of 80%, 9.2 kg of brown cane sugar, 37 kg of finely ground dehulled soya beans, 1.4 kg of sodium chloride and 7.4 kg of skimmed milk powder are dry blended. The mixture is sprinkled while being stirred with an emulsion of 5.2 kg of soya oil in 8.3 kg of water.

This mixture is extrusion cooked under conditions similar to those described in Example 1. An expanded cooked base is obtained which has a density of 0.13 g/cm$^3$. It is reduced to granules having an average size of 1.2 mm.

19.5 kg of brown cane sugar, 74 kg of glucose syrup having a DE of 40, 28.7 kg of honey, 286 g of powdered natural vanilla extract and 32.6 kg of water are mixed together.

In the same way and under the same conditions as described in Example 1, the binder is added to the granules by spraying at a rate of 61 parts of binder for every 100 parts of granules. The mass which is obtained is shaped into biscuits 80 mm in diameter and from 13.5 to 14 mm thick, they are removed from the moulds and dried. Biscuits weighing about 25 g and having a water content of 3% are produced.

These protein-enriched biscuits have an attractive dark brown colour which is not altered by the soya. They are tasty and crunchy like the biscuits described in Examples 1 and 2.

EXAMPLE 4

55 kg of oatmeal, 217 kg of wheat flour having an extraction rate of 94 %, 7.5 kg of sodium chloride, 7.5 kg of cane sugar, 7 kg of skimmed milk powder, 7.8 kg of peanut oil and 10 kg of water are mixed together.

The mixture is extrusion cooked at a pressure of from 80 to 100 bars at 165° C. for about 20 s to produce a bundle of small strands of expanded base which emerge from a nozzle, which is a steel plate with numerous small holes. These small strands are cut, flush with the nozzle, by a rotating knife having four blades turning at 5400 rpm. Granules from 0.5 to 1 mm in diameter and from 2 to 5 mm in length with a density of 0.176 g/cm$^3$ are thus obtained directly.

100.5 kg of brown cane sugar, 25.9 kg of honey, 145 g of powdered natural vanilla extract and 62.1 kg of water are mixed together to produce the binder.

The base is sprinkled with the binder heated to 60° C., at a rate of 1.25 kg of binder to every 2 kg of granules loaded continuously per minute, and 97 g per minute of maltodextrin are added in a coating drum which is similar to the one described in Example 1. The mass which is stirred on average for 2 minutes in the dredger, is continuously poured onto a mould of the lattice type with meshes of 1,5 cm side and 1,5 cm deep. The mass is distributed over the lattice and pressed through the meshes by a suitable device. The lattice is then introduced into a hot air oven in which the mass is dried at an air temperature of about 160° C. The cube-like biscuits with 1.5 cm edges weighing 2.5 g and having a water content of 3% are removed from the lattice. These unusual biscuits have an appetising cereal appearance and a golden brown colour, are pleasantly crunchy and on contact with a hot liquid such as milk at 60°–80° C. retain this quality for several minutes.

We claim:

1. A process for preparing a biscuit, which comprises:
   subjecting a base, which comprises from 40 to 80 parts by weight of wheat flour, form 0 to 20 parts by weight of sucrose, from 0.5 to 3 parts by weight of oil or fat and from 0 to 3 parts by weight of water, at a temperature of between 140° C. and 180° C. to a pressure of from 80 to 120 bars and then extruding the base through an extrusion nozzle to release an expanded, cooked base;
   reducing the expanded base to granules;
   adding a binder, which comprises from 5 to 15 parts by weight of water and from 8 to 30 parts by weight of glucose syrup having a dynamic viscosity of from 100 to 300 mPa at from 20° to 30° C., to the base mixing the binder and base for from 2 to 5 minutes at a temperature of from 20° to 30° C. to coat and partially impregnate the granules and form a viscous, sticky mass;
   moulding portions of the mass into shapes under pressure sufficient to compact the mass while preserving the structure of the granules; and
   drying the moulded portions to a moisture content of from 1.5 to 4% by weight.

2. A process according to claim 1 wherein the expanded, cooked base has a density of from 0.1 to 0.3 g/cm$^3$.

3. A process according to claim 1, wherein from 1 to 3 parts by weight of skimmed milk powder and from 0.3 to 2 parts by weight of sodium chloride are added to the base and from 5 to 10 parts by weight of honey are added to the binder.

4. A process according to claim 1, wherein from 5 to 15 parts by weight of legume flour are added to the base.

5. A process according to claim 1, wherein the cereal flour is a wheat flour, having an extraction rate of from 80 to 98%.

6. A process according to claim 1, wherein the base is reduced to granules having an average size of from 0.3 to 3 mm.

7. A biscuit which comprises agglomerated granules of an expanded cooked base which are coated with a binder, the base comprising from 40 to 80 parts by weight of wheat flour, from 0 to 20 parts by weight of sucrose and from 0.5 to 3 parts by weight of oil or fat, the binder comprising from 8 to 30 parts by weight of a material selected from the group consisting of sucrose and a mixture of glucose and its polymers, and mixtures thereof, the food product having a density of from 0.3 to 0.8 g/cm$^3$, and having a shear resistance such that the maximum force required to break the product in two is from about 10 N to about 30 N.

8. A biscuit according to claim 1 wherein the maximum force is from 10 N to 20 N.

9. A biscuit according to claim 1 wherein the maximum force is from 15 N to 30 N.

10. A biscuit according to claim 1 wherein the food product has an index of crunchiness of less than 2.

11. A biscuit according to claim 7 wherein the base further comprises from 1 to 3 parts by weight of skimmed milk powder and from 0.3 to 2 parts by weight of sodium chloride and the binder contains in addition from 5 to 10 parts by weight of honey.

12. A biscuit according to claim 7 wherein the base further comprises from 5 to 15 parts by weight of legume flour.

13. A biscuit according to claim 7 wherein the wheat flour has an extraction rate of from 80 to 98%.

14. A biscuit according to claim 7 wherein the granules have an average size of from 0.3 to 3 mm.

15. A biscuit prepared according to the process of claim 1.

* * * * *

UNITED STATES PATENT AND TRADEMARK OFFICE
CERTIFICATE OF CORRECTION

PATENT NO. : 5,035,906
DATED : July 30, 1991
INVENTOR(S) : Tyko Persson, et al

It is certified that error appears in the above-identified patent and that said Letters Patent is hereby corrected as shown below:

Column 7, line 52 (line 3 of claim 1), "form" should be --from--.

Column 8, line 3 (line 15 of claim 1), after the first occurrence of "base" insert --by--.

Column 8, line 41 (line 1 of claim 8), "1" should be --7--.

Column 8, line 43, (line 1 of claim 9), "1" should be --7--.

Column 8, line 45 (line 1 of claim 10) "1" should be --7--.

Signed and Sealed this

First Day of December, 1992

Attest:

DOUGLAS B. COMER

Attesting Officer

Acting Commissioner of Patents and Trademarks